（12）United States Patent
De Angelis et al.

(10) Patent No.: US 8,978,419 B2
(45) Date of Patent: Mar. 17, 2015

(54) DEVICES FOR CONTROLLING ATMOSPHERE OVER MOLTEN-GLASS FREE-SURFACES

(75) Inventors: Gilbert De Angelis, Lindley, NY (US); Kevin Scott Riegel, Owego, NY (US)

(73) Assignee: Corning Incorporated, Corning, NY (US)

( * ) Notice: Subject to any disclaimer, the term of this patent is extended or adjusted under 35 U.S.C. 154(b) by 84 days.

(21) Appl. No.: 12/942,278

(22) Filed: Nov. 9, 2010

(65) Prior Publication Data

US 2011/0126592 A1 Jun. 2, 2011

Related U.S. Application Data (60) Provisional application No. 61/264,973, filed on Nov. 30, 2009.

(51) Int. Cl.
*C03B 5/187* (2006.01)
*C03B 5/16* (2006.01)
*C03B 5/24* (2006.01)

(52) U.S. Cl.
CPC . *C03B 5/187* (2013.01); *C03B 5/16* (2013.01); *C03B 5/245* (2013.01)
USPC .............................. 65/178; 65/135.3; 65/135.4

(58) Field of Classification Search
CPC ........... C03B 5/18–5/193; C03B 5/225; B01F 7/00–7/00925
USPC .......... 65/135.2–135.4, 178–180; 366/22–24, 366/64–67, 101–107, 139, 142–149, 366/197–207, 241–335, 341, 342–343, 347
See application file for complete search history.

(56) References Cited

U.S. PATENT DOCUMENTS

| 2,172,895 | A | * | 9/1939 | Wadsworth | 65/131 |
| 2,730,338 | A | * | 1/1956 | Gregorius | 366/145 |
| 2,780,890 | A | * | 2/1957 | Russell | 65/490 |
| 2,877,280 | A | * | 3/1959 | Eden | 65/134.2 |
| 2,891,777 | A | * | 6/1959 | Gregorius | 366/290 |
| 3,233,993 | A | * | 2/1966 | Weidel | 65/374.11 |
| 3,469,962 | A |   | 9/1969 | Owen |  |
| 3,539,117 | A | * | 11/1970 | Sjogren | 241/172 |

(Continued)

FOREIGN PATENT DOCUMENTS

| CN | 99246645 | 8/2000 |
| CN | 1962498 A | 5/2007 |

(Continued)

*Primary Examiner* — Jodi C Franklin
(74) *Attorney, Agent, or Firm* — Jeffrey A. Schmidt (57) ABSTRACT

A chamber (101, 201), for holding molten glass (113, 202) having a free surface (114, 203), includes a bellows (4, 204), a sealing ring (10, 210), and a cover (30, 50, 230). The bellows is coupled to the chamber, and the sealing ring is coupled to the bellows. The sealing ring may include one or more various devices, associated with operation of the chamber, including: an atmosphere supply tube (14, 214), an electric lead (12), a pressure differential sensor (16, 216), a thermo couple, an oxygen sensor, and/or an auxiliary port (18). The sealing ring further includes an upper opening (21) having an inner diameter (22). The cover is removably coupled to the sealing ring and extends over the sealing-ring-upper-opening inner diameter, wherein the sealing ring is disposed between the cover and the chamber. The cover may include various separately removable sections (30, 32, 34, 35, 37, 50, 52, 54).

18 Claims, 7 Drawing Sheets

(56) References Cited

U.S. PATENT DOCUMENTS

| | | | |
|---|---|---|---|
| 3,607,166 A * | 9/1971 | Loughridge et al. | 65/17.6 |
| 3,717,450 A | 2/1973 | Loughridge et al. | |
| 3,837,828 A | 9/1974 | Dietz et al. | |
| 3,871,853 A | 3/1975 | Dietz et al. | |
| 3,883,340 A | 5/1975 | French et al. | |
| 3,971,646 A * | 7/1976 | Rhodes | 65/157 |
| 4,365,986 A * | 12/1982 | Nayak | 65/29.21 |
| 4,808,205 A | 2/1989 | Hughes et al. | |
| 4,983,045 A * | 1/1991 | Taniguchi | 366/117 |
| 4,983,198 A * | 1/1991 | Ogino | 65/32.5 |
| 5,319,669 A * | 6/1994 | Cox et al. | 373/29 |
| 5,374,121 A * | 12/1994 | Draenert | 366/242 |
| 5,399,014 A | 3/1995 | Takata et al. | |
| 5,785,726 A * | 7/1998 | Dorfeld et al. | 65/134.1 |
| 6,138,481 A * | 10/2000 | Saito et al. | 65/537 |
| 6,270,248 B1 * | 8/2001 | Yoshida et al. | 366/300 |
| 6,322,240 B1 * | 11/2001 | Omasa | 366/118 |
| 6,993,936 B2 * | 2/2006 | Grzesik et al. | 65/134.9 |
| 7,628,037 B2 * | 12/2009 | Lautenschlaeger et al. | 65/29.12 |
| 7,628,038 B2 * | 12/2009 | DeAngelis et al. | 65/134.1 |
| 7,735,340 B2 * | 6/2010 | Burdette et al. | 65/135.2 |
| 8,087,262 B2 * | 1/2012 | Lineman et al. | 65/134.1 |
| 2002/0172092 A1 * | 11/2002 | Reeder et al. | 366/270 |
| 2005/0007870 A1 * | 1/2005 | Faraldi et al. | 366/130 |
| 2005/0050923 A1 * | 3/2005 | Grzesik et al. | 65/135.6 |
| 2006/0042318 A1 * | 3/2006 | Burdette et al. | 65/134.2 |
| 2006/0221766 A1 * | 10/2006 | Haughton | 366/332 |
| 2006/0242996 A1 * | 11/2006 | DeAngelis et al. | 65/134.1 |
| 2008/0041109 A1 * | 2/2008 | Burdette et al. | 65/135.2 |
| 2008/0120997 A1 * | 5/2008 | Takeshita et al. | 65/134.2 |
| 2009/0038342 A1 | 2/2009 | Pitbladdo | |
| 2009/0205372 A1 * | 8/2009 | Takekoshi | 65/61 |
| 2009/0217708 A1 * | 9/2009 | DeAngelis et al. | 65/134.2 |
| 2009/0241602 A1 * | 10/2009 | DeAngelis et al. | 65/32.5 |
| 2011/0203321 A1 * | 8/2011 | De Angelis et al. | 65/45 |

FOREIGN PATENT DOCUMENTS

| | | |
|---|---|---|
| JP | 8-301621 | 11/1996 |
| JP | 9-295815 | 11/1997 |
| JP | 11-79754 | 3/1999 |
| JP | 2002-145626 | 5/2002 |

* cited by examiner

DEVICES FOR CONTROLLING ATMOSPHERE OVER MOLTEN-GLASS FREE-SURFACES

BACKGROUND

This application claims the benefit of priority of U.S. Provisional Application Ser. No. 61/264,973 filed on Nov. 30, 2009.

FIELD

The present disclosure is directed to devices for controlling the atmosphere at and above molten-glass free-surfaces and, in particular, to the atmosphere at and above molten-glass free-surfaces that exist in chambers that are made of platinum-group materials.

TECHNICAL BACKGROUND

Sheet glass is produced by various techniques known in the art, including float processes, and down-draw processes, such as the overflow down-draw process also known as the fusion process. In all of these processes, flowing molten glass is formed into a continuous glass ribbon which is separated into individual glass sheets.

For glasses having high melting temperatures, for example those used to produce LCD or other display substrates, at least some of the melting, fining, stirring, conditioning, delivery, and forming equipment is made of materials comprising platinum-group metals, with platinum and platinum alloys, e.g., platinum-rhodium alloys, being the most commonly used materials. As used herein the platinum-group metals include platinum, rhodium, palladium, iridium, rhenium, ruthenium, and osmium.

The presence of platinum-containing defects, due to the use of platinum-group metals, has been a long standing problem in the production of LCD glass substrates. Commonly-assigned U.S. Published Patent Application 2009/0217708 (hereinafter the '708 application) discusses one source of platinum-group metal defects, namely, the formation of condensates of platinum-group metals, e.g., platinum, at locations in the manufacturing process at which there is a glass free-surface. The '708 application also discusses an approach—to reducing the number of condensate-based, platinum-group defects—that includes forming a substantially-isolated/controlled, limited-volume, gas-filled space at and above a molten-glass free-surface (hereinafter simply referred to as "limited-volume controlled-atmosphere"). However, the chambers in which the molten-glass free-surfaces exist may also be contained in a capsule having its own controlled environment for reducing the occurrence of gaseous inclusions in glass sheets as a result of hydrogen permeation through the platinum-containing walls. And the characteristics of an environment for reducing platinum defects may not be the same as those of an environment for reducing hydrogen permeation. Accordingly, the limited-volume controlled-atmosphere is separated from, and includes a different composition than, the capsule atmosphere. The '708 application also discusses devices for forming the limited-volume controlled-atmosphere, i.e., devices for separating the limited-volume controlled-atmosphere from the capsule atmosphere.

SUMMARY

The present application builds on the devices of the '708 application. That is, the apparatuses of the present application also separate a limited-volume controlled-atmosphere from a capsule atmosphere, but then include structure and functionality that facilitate maintenance and/or repair of the chambers in which the molten-glass free-surfaces exist and/or of the apparatuses themselves for forming the limited-volume controlled-atmosphere. Further, the apparatuses of the present application facilitate the above-noted maintenance and/or repair while at the same time also minimizing disturbances to the limited-volume controlled-atmosphere from the general plant environment, i.e., that which is outside the capsule but which exists in the facility in which there is housed the capsule and/or chambers holding molten glass having a free surface. Various aspects of the apparatuses, or combinations of those aspects, may lead to the above-noted and other advantages. Some aspects include, for example: the design, size and proportion of the apparatus relative to the devices associated with the chamber; the segmented nature of the apparatus itself; a structure holding various service connections for the apparatus and/or chamber that holds molten glass having a free surface; and a bellows, for allowing the chamber to maintain its functionality while still containing the limited-volume controlled-atmosphere, even in the face of a chamber undergoing thermally (or otherwise) induced dimension change.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various aspects of the invention disclosed in this specification and in the drawings can be used in any and all combinations. By way of non-limiting example the various aspects of the invention may be combined with one another as follows:

According to a first aspect, there is provided an apparatus, for holding molten glass, including:
    a chamber for holding the molten glass;
    a bellows coupled to the chamber;
    a sealing ring coupled to the bellows, wherein the sealing ring comprises one or more of: an atmosphere supply tube, an electric lead, a pressure differential sensor, a thermo couple, an oxygen sensor, and an auxiliary port, the sealing ring further comprising an upper opening having an inner diameter, wherein the one or more of an atmosphere supply/exhaust tube, an electric lead, a pressure differential sensor, a thermo couple, an oxygen sensor, and an auxiliary port, is disposed between the upper opening and the chamber; and
    a cover removably coupled to the sealing ring and extending over the sealing-ring-upper-opening inner diameter, wherein the sealing ring is disposed between the cover and the chamber.

According to a second aspect, there is provided the apparatus of aspect 1, wherein the sealing ring is coupled to the chamber by the bellows, the bellows is coupled to the cover by the sealing ring, and further comprising a stirring rod extending into the chamber.

According to a third aspect, there is provided the apparatus of aspect 1, wherein the cover is coupled to the sealing ring by the bellows, the bellows is coupled to the chamber by the sealing ring, and further comprising a tube and pressure ring coupled between the sealing ring and the chamber.

According to a fourth aspect, there is provided the apparatus of aspect 3, wherein the chamber is a standpipe, and the apparatus further includes:

a probe rod extending from the standpipe, through the sealing ring, through the bellows, and through the cover, wherein the probe rod includes an upper portion that is disposed on a side of the cover opposite to that on which the sealing ring is disposed; and a support arm connected to the upper portion of the probe rod, wherein the support arm includes a truss.

According to a fifth aspect, there is provided the apparatus of aspect 4, further including:

a rack fixedly coupled to the support arm and including a longitudinal axis;

a drive motor coupled to the rack so as to move the rack along its longitudinal axis; and first and second constraints coupled to the rack so as to guide the rack for movement by the drive motor, wherein the first and second constraints are displaced from one another in a direction along the longitudinal axis.

According to a sixth aspect, there is provided an apparatus, for holding molten glass, including:

a chamber for holding the molten glass, the chamber having an inner diameter;

a lower cover removably coupled to the chamber and disposed/extending over the chamber inner diameter, wherein the lower cover has an upper opening, the upper opening having a diameter; and an upper cover removably coupled to the lower cover and disposed/extending over both the chamber inner diameter and the upper-opening diameter.

According to a seventh aspect, there is provided an apparatus for stirring including:

a stir chamber containing molten glass having a free surface during normal operating conditions;

a stirring rod extending into the stir chamber and being disposed at a normal operating position, the stirring rod being movable in a first axial direction over a first distance from the normal operating position to a displaced position;

a stirring blade coupled to the stirring rod and disposed in the stir chamber at a second distance below the glass free-surface when the stirring rod is in the normal operating position, wherein axial movement of the stirring rod from the normal operating position toward the displaced position moves the stirring blade toward the glass free-surface; and an obstruction coupled to the stirring rod, wherein the obstruction limits the axial movement of the stirring rod in the first direction to the first distance, wherein the first distance is greater than or equal to the second distance.

According to an eighth aspect, there is provided the apparatus of aspect 7, further comprising a cover coupled to the stir chamber, wherein the obstruction limits the axial movement of the stirring rod by interacting with the cover.

According to a ninth aspect, there is provided the apparatus of any one of aspects 1 or 8, wherein the cover comprises an upper cover and a separate lower cover.

According to a tenth aspect, there is provided the apparatus of any one of aspects 6 or 9, wherein one of the upper and lower covers comprises two clamshell sections.

According to a eleventh aspect, there is provided the apparatus of any one of aspects 6 or 9, wherein the one of the upper and lower covers comprises the lower cover, and the lower cover further comprises a center portion to which the two clamshell sections are removably coupled.

According to a twelfth aspect, there is provided the apparatus of aspect 11, wherein the center portion comprises two separately removable cover sections coupled to one another.

According to a thirteenth aspect, there is provided the apparatus of aspect 12, further comprising a holding ring to which the center portion and two clamshell sections are coupled.

According to a fourteenth aspect, there is provided the apparatus of any one of aspects 6 or 9, wherein the lower cover includes a maximum inner diameter, the upper cover includes a maximum inner diameter, and the upper-cover maximum inner diameter is less than the lower-cover maximum inner diameter.

According to a fifteenth aspect, there is provided the apparatus of aspect 14, wherein the obstruction includes a diameter, and the upper cover maximum inner diameter is larger than the obstruction diameter.

According to a sixteenth aspect, there is provided the apparatus of any one of aspects 6 or 9, wherein the stir chamber includes an inner diameter, the lower cover includes a minimum inner diameter, wherein the lower-cover minimum inner diameter is less than the stir-chamber inner diameter.

According to a seventeenth aspect, there is provided the apparatus of any one of aspects 6 or 9, further comprising a sealing ring coupled to the lower cover.

According to an eighteenth aspect, there is provided the apparatus of aspect 17, wherein the sealing ring comprises one or more of: an atmosphere supply/exhaust tube, an electric lead, a pressure differential sensor, a thermo couple, an oxygen sensor, and an auxiliary port.

According to a nineteenth aspect, there is provided the apparatus of any one of aspects 6, 9, or 17, further comprising a bellows coupled to the lower cover.

According to a twentieth aspect, there is provided the apparatus of aspect 19, further comprising a screw threaded element coupled to the bellows.

According to a twenty first aspect, there is provided the apparatus of any one of aspects 8-20, wherein the cover further comprises a well.

DETAILED DESCRIPTION

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Directional terms—for example right, left, front, forward, back, backward, up, down, top, bottom—are used in connection with the figures as shown and are not meant to imply an absolute orientation.

As used herein, the singular forms "a," "an" and "the" include plural referents unless the context clearly dictates otherwise. Thus, for example, reference to a "component" includes aspects having two or more such components, unless the context clearly indicates otherwise.

The present disclosure sets forth apparatuses for forming substantially-isolated/controlled, limited-volume, gas-filled space at and above a molten-glass free-surface (hereinafter simply referred to as "limited-volume controlled-atmosphere") as found in various components of a glass-making process where one or more structures which comprise platinum-group metals which can serve as a source for condensate defects are located at or above the free surface. Although the present disclosure may reference a fusion draw or down-draw processes for making glass sheets, it should be understood that the various concepts disclosed herein are more generally applicable to any type of glass making process, for example, up-draw, slot-draw, and float. The apparatuses may be used to manage a limited-volume controlled-atmosphere as described in U.S. Published Patent Application 2009/0217708 so as to reduce platinum group defects in glass produced for use as substrates in the production of, for example, liquid crystal and other types of displays. Although specific exemplary glass-containing chambers are set forth—a stirring device, and a level probe, for example—the apparatuses described herein may be used with any chamber including a platinum-group metal that holds molten glass having a free surface, wherein it is desired to control the atmosphere at and above the free surface in order to reduce platinum group defects in the glass in communication with or held within the chamber and subsequently formed into glass articles, for example, substrates for display devices.

One embodiment of an apparatus for managing a limited-volume controlled-atmosphere is described in connection with a stirring device. The apparatus for managing the limited-volume controlled-atmosphere includes features that allow maintenance and/or repair of the stirring device while minimizing disruption to the limited-volume controlled-atmosphere and/or the apparatus itself. The features include the design, size and proportion of the cover structure relative to the stirring device, and the segmented nature of the cover structure itself. These and other features as described herein, or as apparent to one skilled in the art, may be used in any and all combinations.

An example of a first embodiment—of a device for managing a limited-volume controlled-atmosphere over a molten-glass free-surface—will now be described with reference to FIGS. 1-5. These figures show one embodiment of an apparatus 2 for forming a limited-volume controlled-atmosphere in a stirring device 100.

Figure 1:
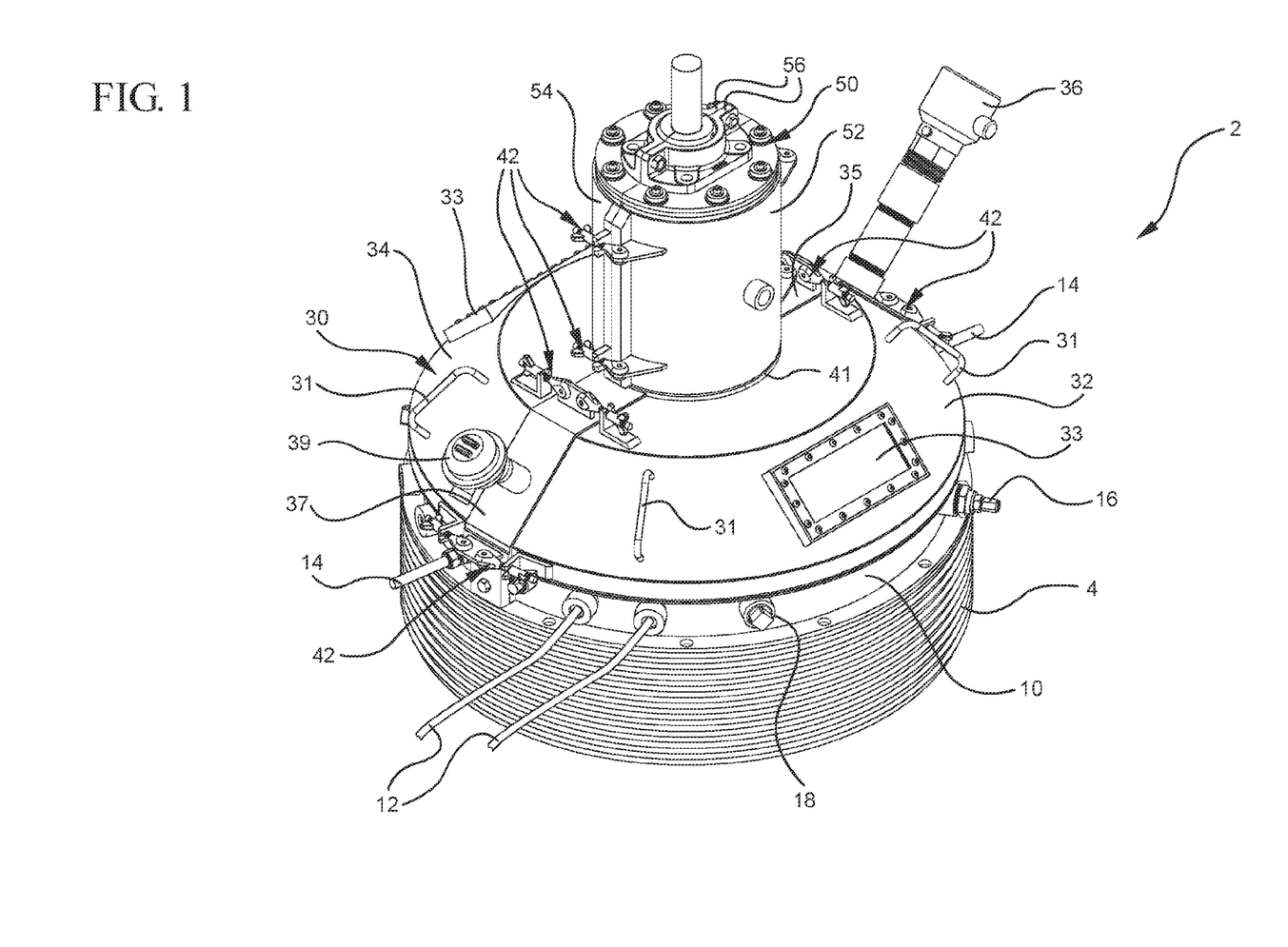
FIG. 1 is a perspective view of an apparatus for controlling an atmosphere at and above a glass free-surface in a chamber, according to one embodiment.

As shown in FIG. 1, the apparatus 2 includes a bellows 4, a sealing ring 10, a lower cover 30, and an upper cover 50. These elements may be used together as described, may be used individually, or in any and all combinations, to provide any desired features offered by each.

Figure 2:
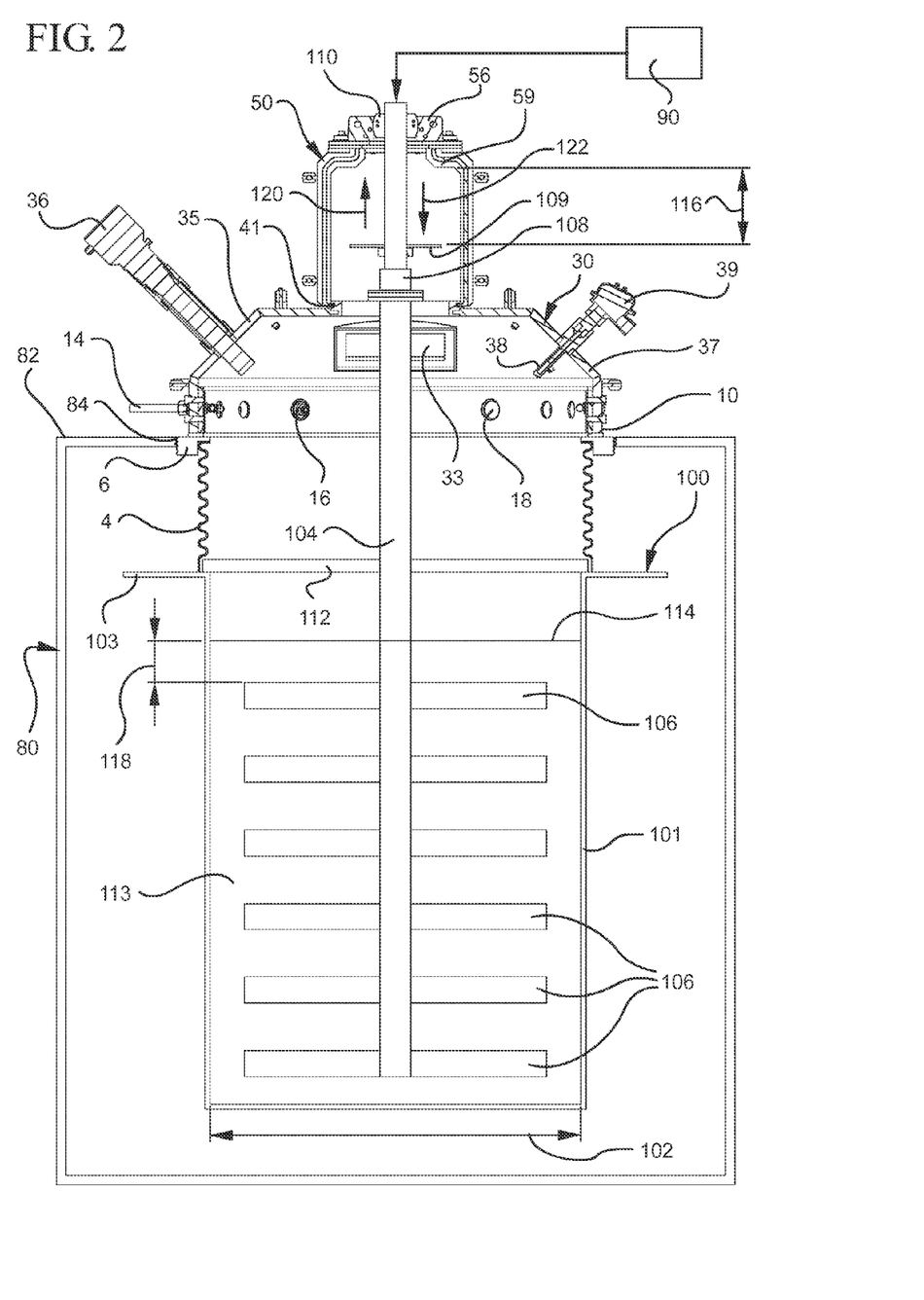
FIG. 2 is a schematic side view of the apparatus of FIG. 1 together with a stirring device and an atmosphere control capsule.
Figure 3:
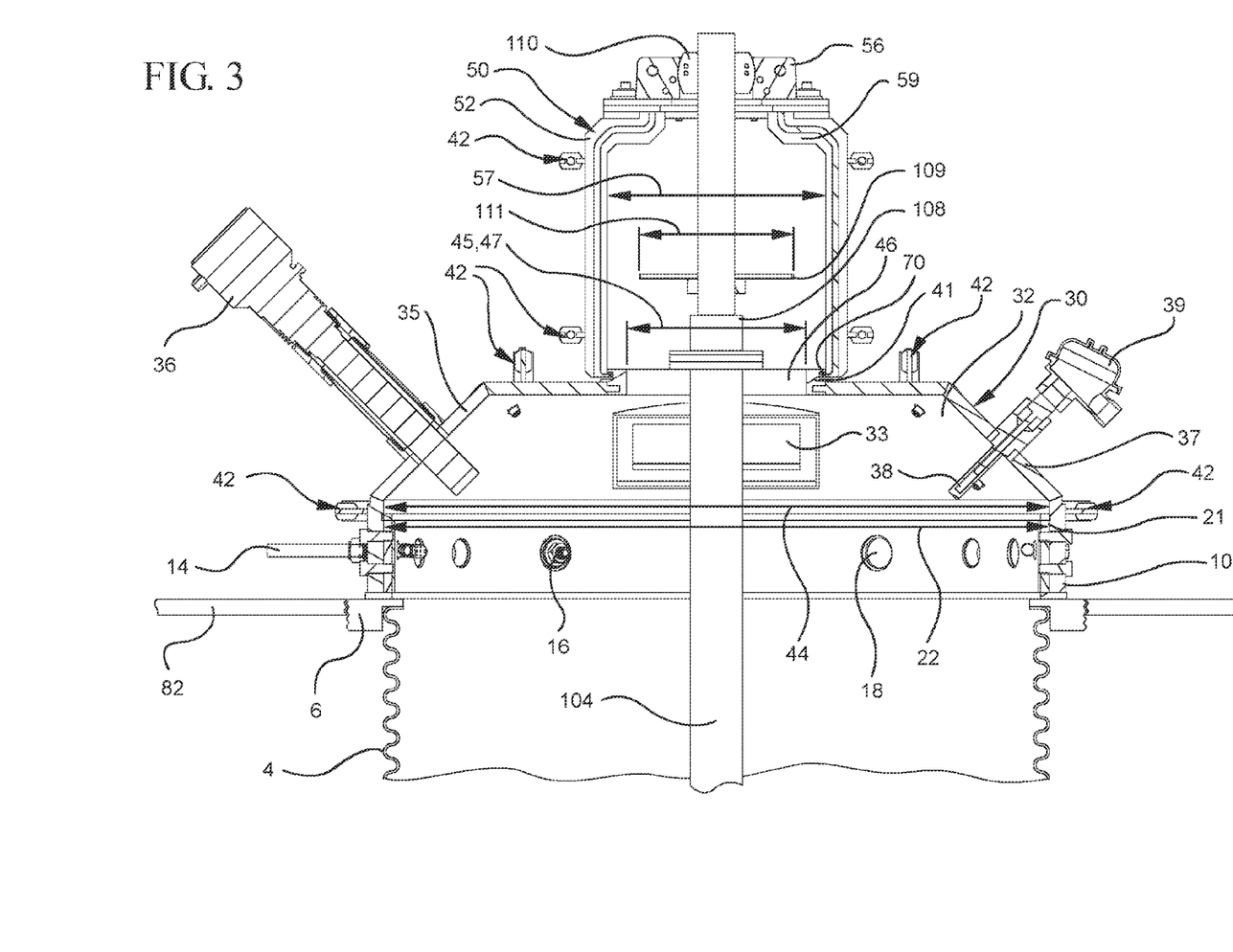
FIG. 3 is an enlarged view of a top portion of the apparatus as shown in FIG. 2.

The apparatus 2 is schematically shown as being installed on a stirring device 100 in FIG. 2. The stirring device 100 includes a stir chamber 101 that holds molten glass 113 having a free surface or glass level 114 (hereinafter simply referred to as either "free surface" or "glass level" as appropriate to the context) when the stirring device is in its normal operating condition. The stir chamber 101 includes an inner diameter 102, and a flange 103 near its upper end. The flange 103 may be an electrode used to heat the stir chamber 101, or may simply be an outward extension of—integrally/monolithically formed with, or attached to—the stir chamber 101. A stirring rod 104 extends into the stir chamber 101, and includes stirring blades 106 disposed thereon. The stirring blades 106 are disposed in the molten glass 113 and homogenize the molten glass 113 when the stirring rod 104 rotates. The upper-most stirring blade 106 within the molten glass 113 is disposed at a distance 118 below the glass level 114. Farther up the stirring rod 104, there may be disposed an obstruction or protrusion. As shown in FIG. 3, the protrusion may be a coupling 108 between portions of the stirring rod 104, or may be a particle catcher ring 109 having a diameter 111, for example. Still farther up the stirring rod 104, there is disposed a bushing 110 that is held by the upper cover 50 to facilitate rotation of the stirring rod 104.

The stirring device 100 may include a cover block 112 coupled to the top of the stir chamber 101. The cover block need not be present but, when it is, may provide further insulation, heating, and monitoring, functions. That is, the cover block 112 is typically made of insulating materials, includes a heater near the annulus through which the stirring rod 104 extends, and may mount a thermocouple or other condition monitoring devices.

In FIG. 2, the stirring device 100 is shown in its normal operating condition. That is, when the stir chamber 101 is filled with molten glass 113 to a glass level 114, and the stirring rod 104 is disposed in a vertical position wherein the stirring blades 106 are in the molten glass.

In FIG. 2, the stirring device 100 is shown as being disposed within a main atmosphere control chamber 80. The chamber 80 may be part of a capsule which provides a controlled environment around various components—finer, stir chamber, bowl, and connecting conduits, for example—in a glass-making apparatus. The capsule is designed to reduce the occurrence of gaseous inclusions in glass sheets, made by the glass-making apparatus, as a result of hydrogen permeation through the platinum-containing walls of these components. See U.S. Patent Application Publication No. U.S. 2006/0242996. The main atmosphere control chamber 80 includes a top 82 to which the apparatus 2 is coupled.

Also, as schematically shown in FIG. 2, disposed above the chamber 80 there are mechanisms 90 for operating the stirring rod 104. The mechanisms 90 may include a drive device to rotate the stirring rod 104, as well as a drive device to move the stirring rod 104 up in a first direction 120, and down in a second direction 122.

The bellows 4 isolates the atmosphere over the molten glass surface 114 from that in the main atmosphere control chamber 80 surrounding the stirring device 100. As shown in FIG. 2, the bellows 4 is coupled to the stir chamber 101, typically by the flange 103. More specifically, one end of the bellows 4 rests on the flange 103, and the other end is coupled to the top 82 of the chamber 80 via a threaded connection. A threaded ring 6 is coupled to the end of the bellows 4, and mates with complementary screw threads 84 on top 82. The ring 6 may then be rotated to set the bellows 4 at an initial position in contact with the flange 103, and with a desired level of compression to form a suitable seal between the bellows 4 and the flange 103. The screw-threaded connection provides a manner of adjusting the bellows position to suit various initial vertical locations of the stir chamber 101 and, more particularly, of flange 103. As the stir chamber 101 expands and/or contracts (due to thermal or otherwise induced dimensional changes) the bellows 4 absorbs the change in dimension. The bellows 4 is made of a material, for example a platinum-group or other metal, that can withstand the temperatures that exist above a molten-glass stirring chamber. The bellows 4 may be a metallic element, but is electrically isolated from the main atmosphere control chamber 80 and/or the stirring device 100 by appropriately placed electrical isolation gaskets or materials. Although the bellows 4 is shown in the figures as including folds or pleats, this term is not so limited and is meant to more generally include all types of flexible and expandable/contractible enclosures/vessels.

Figure 5:
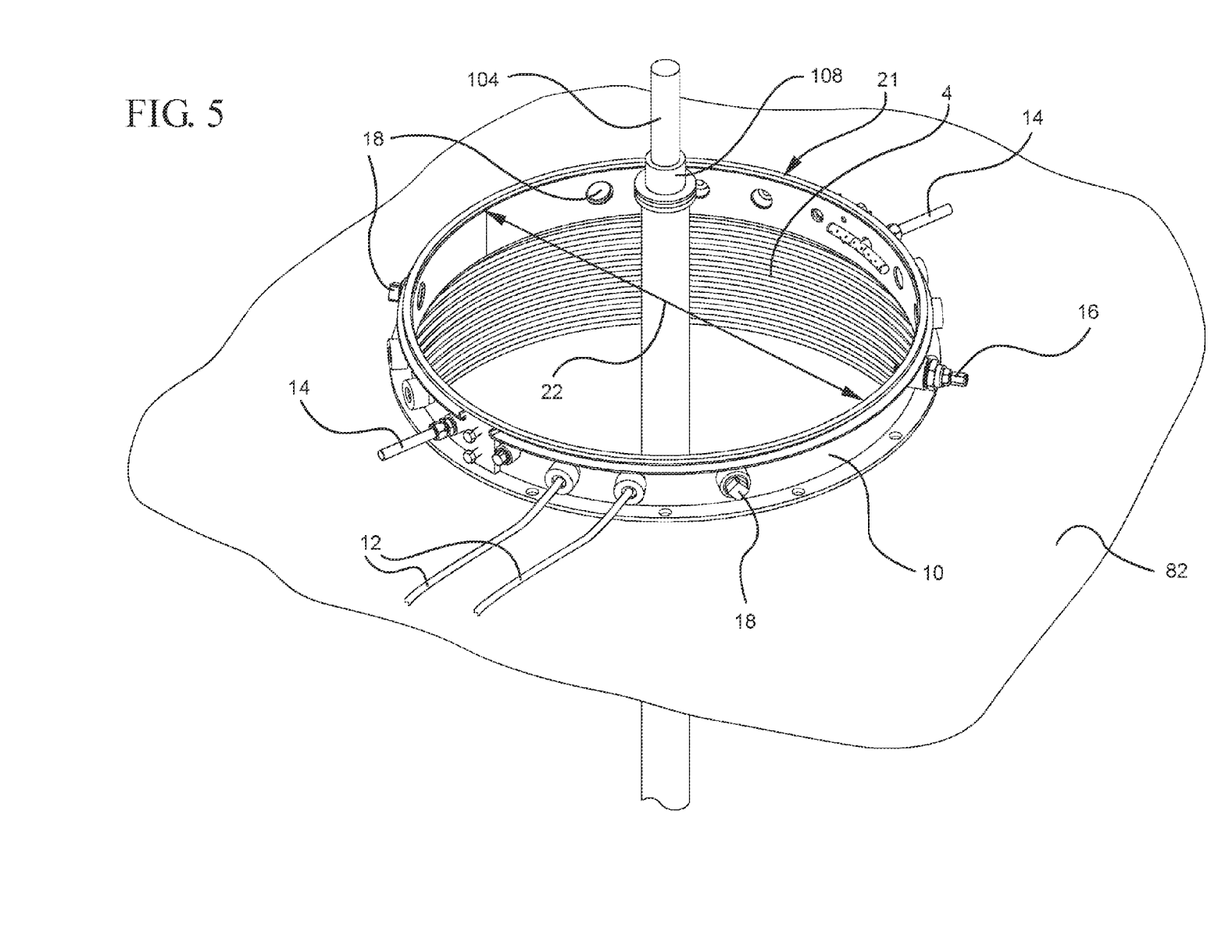
FIG. 5 is a perspective view of the apparatus of FIG. 1 partially in place on an atmosphere control capsule.

The sealing ring 10 provides a ready mounting place for various devices and connections used during operation of the stirring device 100. For example, the sealing ring 10 may included: pass-through/mounting for electrical leads 12; atmosphere inlet/exhaust tubes 14; a pressure sensing port 16; an auxiliary port 18; dew-point sensor; and/or an oxygen sensor. The electrical leads 12 may be those for the heater and/or monitoring devices on cover block 112. Bushings are provided around the leads 12 to establish a fluid-tight seal. The auxiliary port 18 may be used to provide access for hand-held monitoring devices, for example, pressure sensor, oxygen sensor, dew-point sensor, and/or thermocouple. Sealing ring 10 is coupled to the bellows 4, and may be used together therewith as a unit. As shown in FIG. 5, for example, the sealing ring 10 and bellows 4 may be left in place on the top 82 of chamber 80 when the lower cover 30 and upper cover 50 are removed for maintenance, repair, and/or replacement, of the stirring device 100 or portions thereof By leaving the sealing ring 10 and bellows 4 in place, when it is unnecessary to move the stirring chamber 101 for the maintenance/repair, the glass free-surface 114 in the stirring device 100 remains isolated from the atmosphere in the chamber 80. Additionally, the various devices and connections used during operation of the stirring device 100 may be left in place to facilitate: the maintenance/repair/replacement itself; continued stirrer operation during the maintenance/repair; and/or a return to normal stirring device operation after maintenance/repair/replacement. FIG. 5 shows the apparatus 2 with both the lower 30 and upper 50 covers removed, while the sealing ring 10 and bellows 4 remain in place on the top 82 of the chamber 80. The sealing ring 10 may be a metallic element but, similarly to the bellows 4, appropriately electrically isolated from other components by appropriately placed electrical isolation gaskets or materials. As shown in FIGS. 2, 3 and 5, the sealing ring 10 includes an upper opening 21 having an inner diameter 22.

Lower cover 30 includes, with reference to FIG. 1, a first lower clamshell section 32, a second lower clamshell section 34, a first center cover-section 35 and a second center cover-section 37, wherein the first and second center cover-sections 35, 37 together form a center portion of the lower cover 30. Although shown as including four parts, this is not strictly necessary; any suitable number of removable sections may be used. The edges of the clamshell sections 32, 34, and center cover-sections 35, 37, are coupled to one another via, for example, a tongue-and-groove, notch, or channel groove, arrangement with a gasket 70 (see FIGS. 3 and 4) disposed therebetween to maintain a fluid-tight relationship. More specifically, the gasket is disposed in the recessed part of the coupling arrangement to protect the gasket from heat and physical damage during regular maintenance. The edges of the clamshell sections 32, 34, for example, would then but against the gasket in the groove, notch, or channel groove. A holding ring 41 (see FIGS. 2 and 3) abuts a portion of the edge of each one of the sections 32, 34, 35, 37, and clamps 42 are disposed so as to securely hold the sections 32, 34, 35, 37 to one another to form the lower cover 30. A tongue-and-groove, notch, or channel groove, arrangement, for example, may be used between each of the sections 32, 34, 35, 37, and the holding ring 41 with a gasket 70 therebetween. The holding ring 41 may be formed as an element separate from each of the sections 32, 34, 35, 37, and be coupled thereto during assembly of the lower cover 30, as described above. Alternatively, the holding ring 41 may be formed in halves, one each integrally or monolithically formed with one of the sections 32, 34, 35, 37, wherein the halves of the holding ring 41 would mate together with a tongue-and-groove, notch, channel groove or similar arrangement for example. Similarly, instead of halves, the holding ring 41 may be formed in any suitable number of pieces, wherein each one of the pieces is integrally or monolithically formed with one of the sections 32, 34, 35, 37. As an alternative, there may be more pieces of the holding ring 41 than there are sections 32, 34, 35, 37. Still further, the holding ring 41 could be formed as an uninterrupted annulus integrally or monolithically formed with one of the sections 32, 34, 35, 37, and would mate to the remaining sections 32, 34, 35, 37 by a tongue-and-groove, notch, or channel groove arrangement, for example. The holding ring 41 and clamps 42 facilitate assembly/disassembly of the lower cover 30, as well as provide stability to the lower cover 30 when one or more of the sections 32, 34, 35, 37 is removed to access the space containing the limited-volume controlled-atmosphere. Because of the segmented structure to the lower cover 30, one may gain access to the space containing the limited-volume controlled-atmosphere with a minimum disruption both to the atmosphere, and to the apparatus 2. That is, any one or more of the sections 32, 34, 35, 37 may be removed while leaving the other sections in place; this also facilitates maintenance/repair/replacement.

Each of the first and second lower clamshell sections 32, 34 includes a viewing window 33 to provide visual access to the space containing the limited-volume controlled-atmosphere, and handles 31 to easily move that section 32, 34. The first center cover-section 35 has an oxygen sensor 36 coupled thereto, whereas second center cover-section 37 includes a well 38 into which there may be disposed thermocouple 39. The well 38 allows removal/replacement of the thermocouple 39 without disturbing the limited-volume controlled-atmosphere. That is, the well 38 is a sealed structure that does not allow fluid communication through the second center cover-section 37, even when the thermocouple 39 is removed. Because the oxygen sensor 36 and thermocouple 39 are disposed on center cover-sections 35, 37, they may be left in place even when the clamshell sections 32, 34 are removed, thereby facilitating maintenance/repair while at the same time allowing for the possibility of continued stirrer operation during the maintenance/repair. Although the oxygen sensor 36 and thermocouple 39 are shown as coupled to the lower cover 30, these elements may instead be disposed on the sealing ring 10.

With reference to FIG. 3, the lower cover 30 includes an upper opening 46 having a diameter 47. Additionally, the lower cover 30 includes a maximum inner diameter 44, and a minimum inner diameter 45. As shown in this figure, the diameter 44 and diameter 22 are the same size; however, this need not be the case. Because the minimum inner diameter 45 is smaller than the diameter 22, when the lower cover 30 is in place (even without the upper cover 50 in place) there is a smaller opening over the limited-volume controlled-atmosphere and, therefore, less disturbance to that atmosphere.

Upper cover 50 includes a first upper clamshell section 52 and a second upper clamshell section 54 that are held to one another by clamps 42. Although two clamshell sections 52, 54 are shown, any suitable number may be used. Similarly to the sections 32, 34, 35, 37 of the lower cover 30, the sections 52 and 54 are coupled to holding ring 41, via a tongue-and-groove, notch, or channel groove arrangement, for example, with a gasket 70 disposed therebetween. The sections 52, 54 are coupled to one another via a tongue-and-groove joint, for example. It is not necessary for gasket material to be disposed between the mating portions of the sections 52, 54, but such may be present if desired. Because of the manner in which the sections 52 and 54 are coupled to one another and to holding ring 41, they may remain in place when one or more of the sections 32, 34, 35, 37 of the lower cover 30 are removed. See, for example, FIG. 4. Each of the sections 52, 54 includes a bushing holding part 56 that together hold bushing 110 that is disposed on the stirring rod 104. With reference to FIG. 3, the upper cover 50 includes a maximum inner diameter 57. The maximum inner diameter 57 is larger than the diameter 111 of the particle catcher ring 109 so that the particle catcher ring 109 may move up and down within the upper cover 50. However, the interaction of the particle catcher ring 109 with the upper cover 50, as at location 59 for example, limits the upward movement of the stirring rod 104 to the distance 116. Although the maximum inner diameter 57 is shown as being slightly larger than the minimum inner diameter 45, and the diameter 47 of the upper opening 46, this need not be the case.

Figure 4:
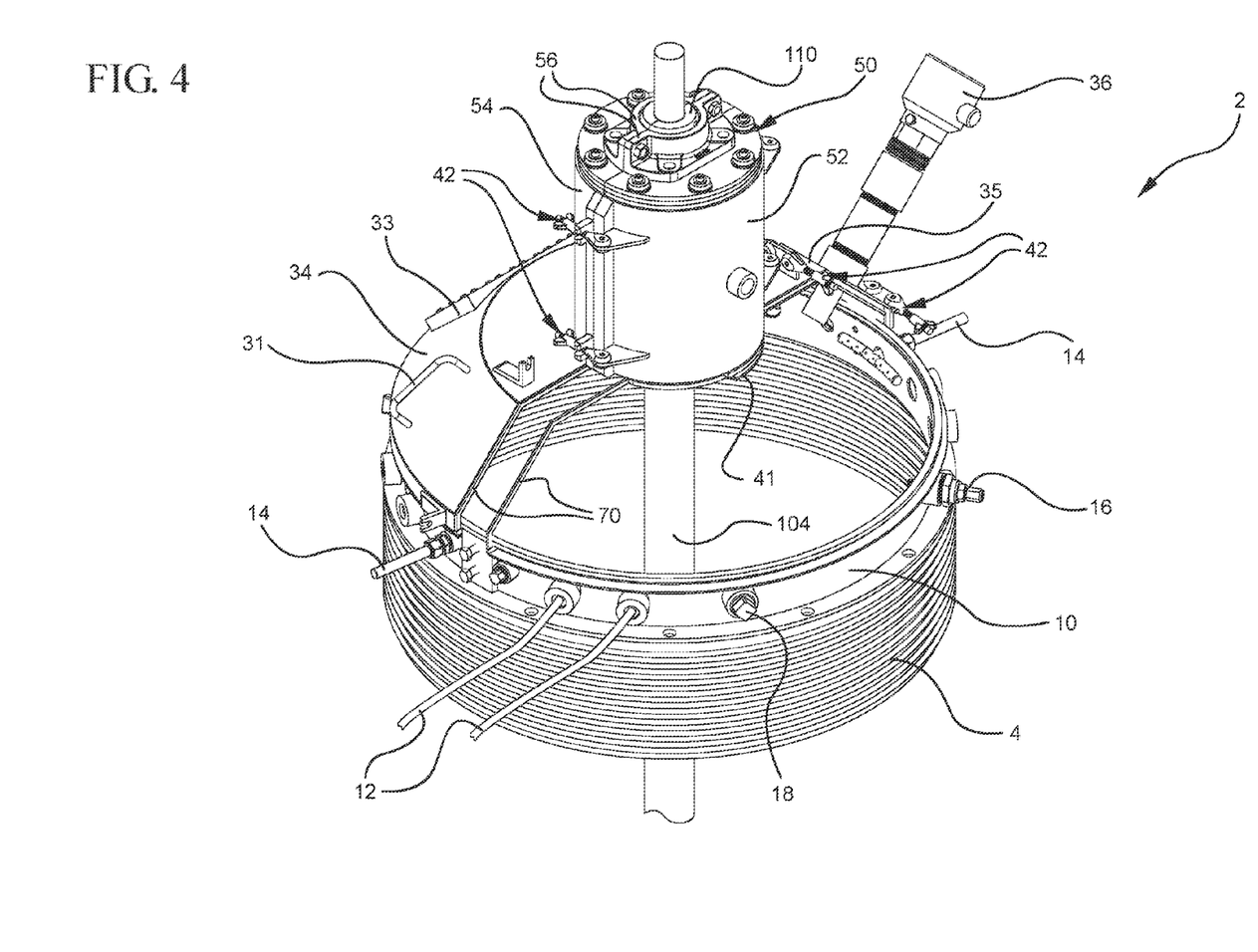
FIG. 4 is a perspective view of the apparatus as shown in FIG. 1, but having two sections of the lower cover removed.

An explanation of the workings/advantages of various features of the apparatus 2 will now be described in the context of various stirring-device 100 maintenance, repair, and/or replacement, operations. In general, to facilitate maintenance/repairs the upper and lower covers 50, 30 are designed, segmented, and separable from one another, so as to provide the user with a manner of forming an opening best suited to the maintenance/repair task at hand while minimizing disturbance to the limited-volume controlled-atmosphere. That is, removing only the sections needed for the maintenance/repair task minimizes the size of the opening made in the apparatus 2 to thereby maximize the amount of protection left in place. For example, FIG. 4 shows the apparatus 2 having sections 32 and 37 of the lower cover 30 removed, whereas sections 34 and 35 of the lower cover 30, as well as sections 52, 54 of the upper cover, may remain in place, to facilitate access to the stirring chamber 100 while still providing some protection to the limited-volume controlled-atmosphere. Gaskets 70 are shown in this figure for purposes of illustration, but that associated with section 32 would likely also be removed in the event that section 37 is removed.

One stirrer maintenance operation is a stirrer wash. This operation is designed to remove condensate and/or build-up near and/or above the glass level 114 in the stir chamber 101. During a stirrer wash, the stirring rod 104 is raised in the direction 120 so that a blade 106 is near the glass level 114. The stirring rod 104 is rotated in this position to cause motion in the glass beyond that which occurs during normal operation of the stirring device 100. The increased motion of the glass washes the condensate and/or build-up off of the stir chamber 101. The stirring rod 104 is then moved in direction 122 back to its normal operating position (i.e., that as shown in FIG. 2). Thus, in order to perform this operation, the stirring rod 104 must be moved in direction 120 by about a distance 118 so that blade 106 will be disposed near the glass level 114.

On one hand, if the distance 116—between the particle catcher ring 109 and the upper cover 50—is greater than the distance 118, the entire apparatus 2 may be left in place during the stirrer wash. That is, no opening in the apparatus 2 is necessary. Therefore, there is minimized any disturbance to the limited-volume controlled-atmosphere. On another hand, if the distance 116 is less than the distance 118, a stirrer wash may still be performed while providing some protection to the limited-volume controlled-atmosphere. That is, the upper cover 50 may be removed, while leaving the lower cover 30 in place, so that the stirring rod 104 may be raised greater than the distance 116. Because the upper-opening 46 in the lower cover 30 has a diameter 47 less than that 22 of the opening 21 in the sealing ring 10, the lower cover 30 provides some protection from disturbance to the limited-volume controlled-atmosphere even with the upper cover 50 removed.

Another maintenance/repair operation may involve replacing parts of the stirring device 100. For example, the parts associated with the cover block 112, or even the cover block 112 itself, may need to be replaced. In such a situation, a minimum number of sections of the lower 30 and upper 50 covers may be removed to provide appropriate access while leaving the other sections in place to minimize disturbances to the limited-volume controlled-atmosphere. For example, in order to replace a thermocouple mounted on cover block 112, suitable access may be provided by removing one of the first or second lower clamshell sections 32, 34. The remaining section 34 or 32, and sections 35, 37, 52, 54, may be left in place. Removing only one of the sections 32, 34 may be sufficient to replace the entire cover block 112 in the event that the cover block 112 can be disassembled in situ to parts smaller than the size of the opening provided by removing one of the sections 32, 34. Alternatively, one or more additional sections 34, 32, 35, 37 may be removed as necessary to remove the sections of the cover block 112, or to perform other repairs/replacements.

In any of the above operations, the bellows 4 and sealing ring 10 may be left in place on top 82 of chamber 80 to prevent the atmosphere of the chamber 80 from adversely affecting the limited-volume controlled-atmosphere over the glass free-surface 114. Further, because the sealing ring 10 is left in place, the inlet/exhaust tubes 14 may remain operational to provide the desired gas to, and remove gas from, the limited-volume controlled-atmosphere. In this manner, disturbances to the limited-volume controlled-atmosphere may be minimized, and the limited-volume controlled-atmosphere may quickly be brought back to a desired operational state after the maintenance/repair operation is complete. Still further, this arrangement allows the stirring device 100 to remain operational—due to continued connections of the electrical leads and/or sensors mounted on the sealing ring 10—even in the event that both the upper cover 50 and/or lower cover 30 are removed.

In the event that the stirring rod 104, or any part thereon, needs to be replaced, the upper cover 50 and lower cover 30 may be removed. The bellows 4 and sealing ring 10 may remain in place. See FIG. 5. Again, accordingly, the atmosphere of the chamber 80 is prevented from adversely affecting the limited-volume controlled-atmosphere over the glass free-surface 114, and the inlet/exhaust tubes 14 remain operational to provide the desired gas to, and remove gas from, the limited-volume controlled-atmosphere so as to maintain it in a desired state, i.e., as close to normal operating state as possible with the covers 30, 50 removed.

A second embodiment of an apparatus for managing a limited-volume controlled-atmosphere is described in connection with a level probe that measures the level of molten glass in a melting and/or delivery system. The apparatus according to this embodiment includes features that allow the level probe to operate, as well as to be maintained and/or repaired, while minimizing disruption to the limited-volume controlled-atmosphere. The features include: a sealing ring; a bellows; and a cover. The bellows allows the level probe rod to move up and down to perform its function of measuring glass level while, at the same time, containing the limited-volume controlled-atmosphere. Additionally, the level probe itself may have enhanced features—for example a strengthened probe-rod support arm, a reinforced rack constraint, and/or a more secure connection between the support arm and probe rod—to enhance use of the apparatus for controlling the atmosphere at and above a glass free-surface. The features may be used in any and all combinations.

Figure 6:
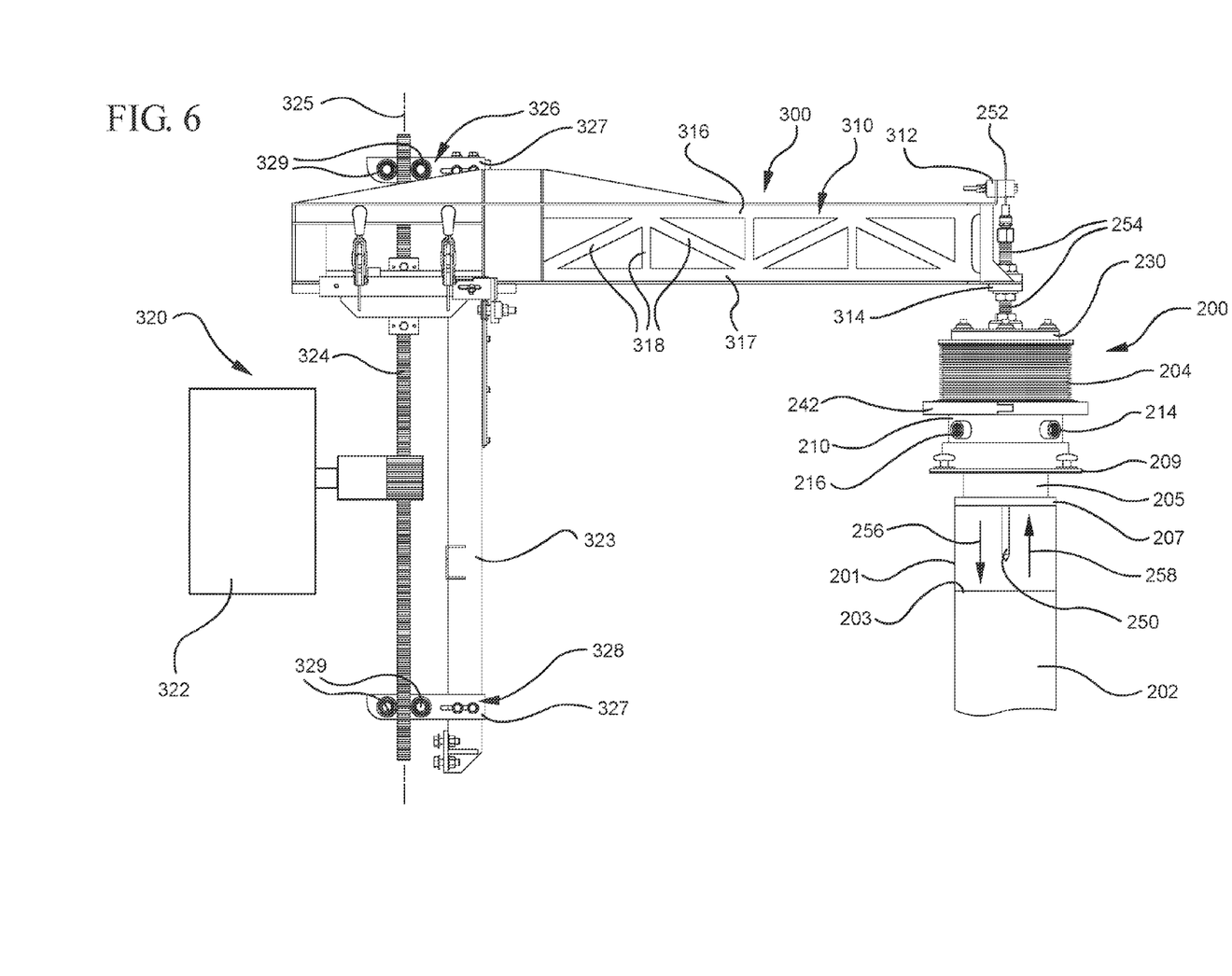
FIG. 6 is a side view of an apparatus for controlling an atmosphere at and above a glass free-surface in a chamber, according to a second embodiment, together with a level probe and level-probe movement apparatus.
Figure 7:
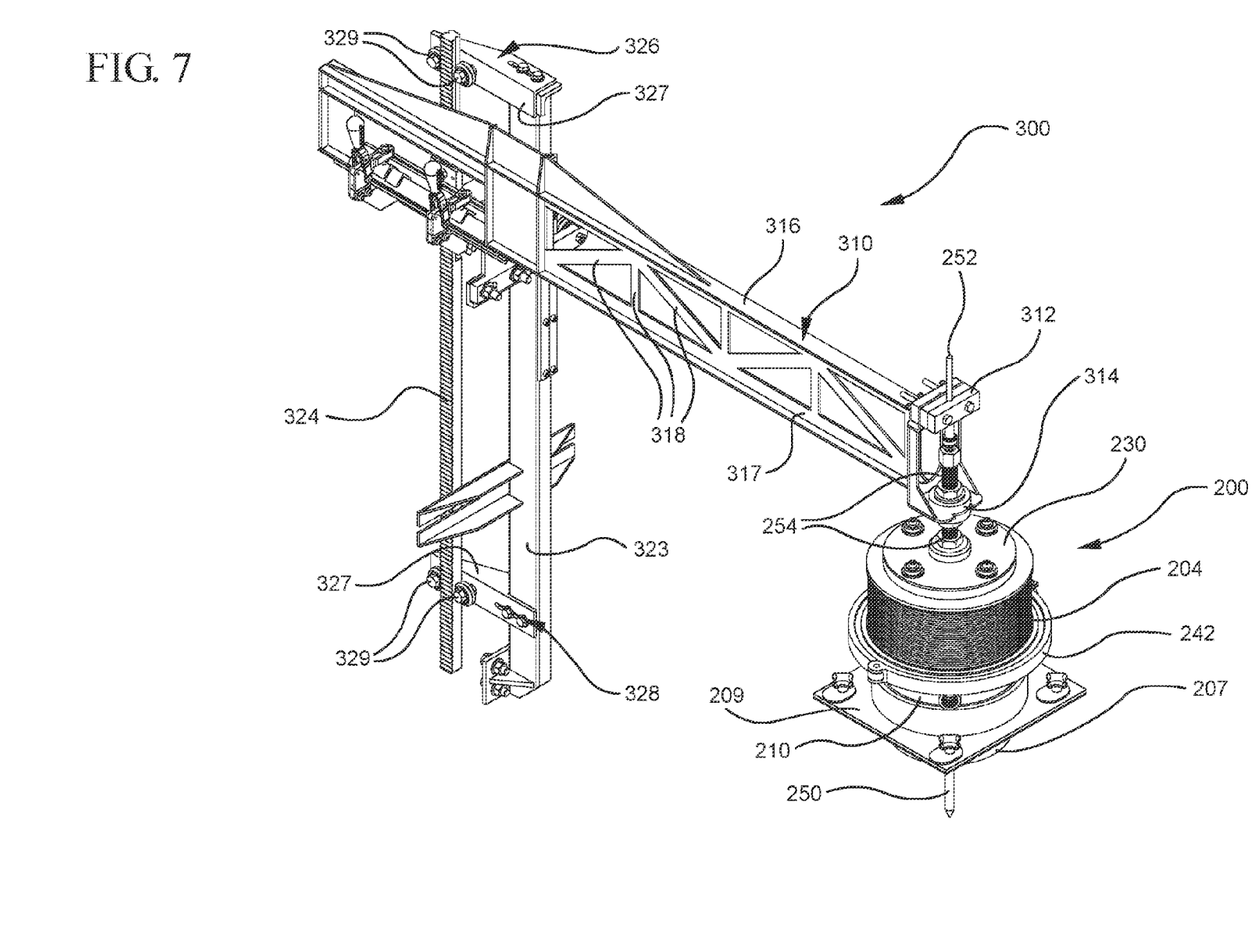
FIG. 7 is a perspective view of the apparatus of FIG. 6.

An example of a second embodiment—of a device for managing a limited-volume controlled-atmosphere over a molten-glass free-surface—will now be described with reference to FIGS. 6-7. These figures show one embodiment of an apparatus 200 for forming a limited-volume controlled-atmosphere with a level probe instrument. A level probe is used to measure the glass level in a glass-making apparatus by contacting a probe rod 250 with the free-surface 203 of glass 202 in a standpipe 201. The standpipe 201 may be coupled with any suitable structure in the glass-making apparatus—for example a finer, a delivery pipe, or a bowl, in a fusion down-draw process—so as to hold molten glass at a level indicative of that to which it exists in the structure of interest. As such, the standpipe 201 may be considered a chamber for holding molten glass that has a free surface. The level probe and standpipe 201, to which the present apparatus 200 may be applied, are more fully described in U.S. patent application Ser. No. 12/509,668 as filed on Jul. 27, 2009. Although described in connection with a fusion down-draw process, the apparatus 200 may be used with any glass-making process for example up-draw, slot-draw, or float. The apparatus 200 includes a sealing ring 210, a bellows 204, and a cover 230. Appropriate electrical isolation gaskets or other materials may be used with the various components of the apparatus 200 so as to avoid unintended grounding of the apparatus 200 and/or level probe.

The sealing ring 210 is similar to the sealing ring 10 described above in connection with the stirring device 100. As such, the sealing ring 210 may include any of the features discussed above in connection with sealing ring 10, for example atmosphere inlet/exhaust tubes 214; a pressure sensing port 216; auxiliary ports; dew-point sensor; and/or an oxygen sensor. On one end, the sealing ring 210 removably is coupled to the bellows 204 by a clamp 242. On its other end, the sealing ring 210 is coupled to the standpipe 201 via a tube 205 and a pressure ring 207. The tube 205 includes screw-threads (not shown but similar to screw-threaded ring 6 described above) for interaction with complementary screw threads on plate 209 that is fixed to the top of a main atmosphere control chamber (similar to chamber 80 having top 82 described above in connection with the first embodiment). Accordingly, the tube 205 may be rotated to adjust the height (and thereby the pressure) of the pressure ring 207 with respect to the standpipe 201 so as to provide a fluid-tight seal. Thus, the limited-volume controlled-atmosphere above glass free-surface 203 is isolated from the atmosphere in the main atmosphere control chamber via pressure ring 207, tube 205, and sealing ring 210. The limited-volume controlled-atmosphere is further isolated from the general plant atmosphere via bellows 204 and cover 230.

Bellows 204 is similar to the bellows 4 described above in connection with the first embodiment and, therefore, a detailed description will be omitted here. One point of difference between this embodiment and the first is that the bellows 204 is removably coupled to the sealing ring by clamp 242. By uncoupling the bellows 204 from the sealing ring 210, there is provided access to the standpipe 201, the probe rod 250, and the interior of the sealing ring 210, so that maintenance/repair may be easily performed. At the same time, the sealing ring 210, tube 205, and pressure ring 207 remain in place so as to keep the limited-volume controlled-atmosphere above the glass free-surface 202 separated from the atmosphere in the main atmosphere control chamber (similar to chamber 80 as described above). Another point of difference between this embodiment and the first is that the bellows 204 maintains a gas-tight seal between the limited-volume controlled-atmosphere and the plant atmosphere, while allowing operation of the chamber, i.e., in this case allowing the level probe rod 250 to move up and down.

Cover 230 is coupled to the bellows 204 at an end opposite to that on which the sealing ring 210 is coupled. The cover 230 forms a fluid-tight seal with the bellows 204 and may be electrically isolated therefrom by an appropriate gasket or other materials. The cover 230 is also coupled to the level probe rod upper portion 252 by a level probe arm adapter 254. The adapter 254 may be screw-threaded to the cover 230, for example. The level probe arm adapter 254 also includes a compression fitting that couples the adapter 254 to the upper portion 252. Accordingly, as the level probe rod 250, 252 is moved up and down, there is no sliding contact with the cover 230, which sliding contact might produce particles that undesirably fall into the glass 202.

As described above, the apparatus 200 provides a limited-volume controlled-atmosphere over the glass free-surface 203 in the standpipe 201 of the level probe. Accordingly, the condensation and/or build-up of platinum group metals can be reduced, thereby reducing the level of platinum group defects in glass sheets ultimately produced with an apparatus including the device to which the level probe is coupled, or on which the level probe is disposed. However, the apparatus 200 provides increased resistance to downward 256 and upward 258 movement of the probe rod 250. That is, because the level probe rod 250 is coupled to the cover 230, the cover 230 and bellows 204 must be moved up and down together with the level probe rod 250. Accordingly, the present inventors have also made improvements to the level probe movement apparatus 300, as shown in FIGS. 6-7.

On a very general level, the level probe movement apparatus 300 includes a support arm 310, and a drive assembly 320 for moving the support arm 310 in downward 256 and upward 258 directions.

The support arm 310 is coupled to an upper portion 252 of the probe rod 250 with first 312 and second 314 isolation blocks. The second isolation block 314 is coupled to the upper portion 252 via adapter 254. This two-point coupling between the support arm 310 and the probe rod 250 maintains a secure connection between these elements, even in light of the increased force necessary to move the probe rod 250 up and down. Additionally, in previously used arrangements, the support arm 310 was a cantilevered simple beam. In order to meet the increased force demands on the support arm 310, however, the present inventors discovered it beneficial to use a truss arrangement in which an upper beam 316 is connected to a lower beam 317 via connecting beams 318. The truss arrangement of the support arm 310 allows it to withstand the increased forces associated with moving the level probe rod 250 up and down when the apparatus 200 is in place.

The drive assembly 320 includes a drive motor 322 which is coupled to a rack 324 so as to move the rack 324 in downward 256 and upward 258 directions. The arm 310 is then fixedly coupled to the rack 324 so as to move therewith. The rack 324 is guided by an upper constraint 326 and a lower constraint 328 so that its orientation relative to vertical does not change as it is moved by the drive motor 322. The upper 326 and lower 328 constraints each include a bracket 327 and guide wheels 329, for example. The brackets 327 are then mounted to a fixed beam or support 323 so as to remain in place as the rack 324 moves up and down. In previously used arrangements, only one constraint was used to guide the rack 324. However, again, due to the increased forces from increased resistance to motion due to the presence of apparatus 200, as transferred through the support arm 310 to the rack 324, the inventors found it beneficial to use both upper and lower constraints 326, 328 to guide the rack 324.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

What is claimed is:

1. An apparatus for stirring comprising:
a stir chamber having a bottom and a cover;
molten glass disposed in the stir chamber and having a free surface;
a first axial direction defined as pointing from the bottom toward the cover;
a stirring rod extending into the stir chamber and being disposed at a first predetermined position, the stirring rod being movable in the first axial direction over a first distance from the first predetermined position to a displaced position;
a stirring blade coupled to the stirring rod and disposed in the stir chamber at a second distance below the free surface when the stirring rod is in the first predetermined position; and
an obstruction coupled to the stirring rod, wherein the obstruction limits the axial movement of the stirring rod in the first axial direction to the first distance,
wherein the first distance is greater than or equal to the second distance.

2. The apparatus of claim 1, further comprising:
a bellows coupled to the stir chamber;
a sealing ring coupled to the bellows, wherein the sealing ring comprises one or more of: an atmosphere supply tube, an electric lead, a pressure differential sensor, a thermo couple, an oxygen sensor, and an auxiliary port, the sealing ring further comprising an upper opening having an inner diameter, wherein the one or more of an atmosphere supply/exhaust tube, an electric lead, a pressure differential sensor, a thermo couple, an oxygen sensor, and an auxiliary port, is disposed between the upper opening and the stir chamber; and
a cover removably coupled to the sealing ring and extending over the sealing-ring -upper-opening inner diameter, wherein the sealing ring is disposed between the cover and the stir chamber.

3. The apparatus of claim 2, wherein the sealing ring is coupled to the stir chamber by the bellows, and the bellows is coupled to the cover by the sealing ring.

4. The apparatus of claim 1, wherein the obstruction limits the axial movement of the stirring rod by interacting with the cover, and further wherein the obstruction is disposed in a space bounded by the stir chamber and the cover.

5. The apparatus of claim 4, wherein the cover comprises an upper cover and a separate lower cover.

6. The apparatus of claim 5, wherein one of the upper and lower covers comprises two sections.

7. The apparatus of claim 6, wherein the one of the upper and lower covers comprising the two sections further comprises a center portion to which the two sections are removably coupled.

8. The apparatus of claim 7, wherein the center portion comprises two separately removable cover sections coupled to one another.

9. The apparatus of claim 8, further comprising a holding ring to which the center portion and two sections are coupled.

10. The apparatus of claim 5, wherein the lower cover includes a maximum inner diameter, the upper cover includes a maximum inner diameter, and the upper-cover maximum inner diameter is less than the lower-cover maximum inner diameter.

11. The apparatus of claim 10, wherein the obstruction includes a diameter, and the upper cover maximum inner diameter is larger than the obstruction diameter.

12. The apparatus of claim 5, wherein the stir chamber includes an inner diameter, the lower cover includes a minimum inner diameter, wherein the lower-cover minimum inner diameter is less than the stir-chamber inner diameter.

13. The apparatus of claim 5, further comprising a sealing ring coupled to the lower cover.

14. The apparatus of claim 13, wherein the sealing ring comprises one or more of: an atmosphere supply/exhaust tube, an electric lead, a pressure differential sensor, a thermo couple, an oxygen sensor, and an auxiliary port.

15. The apparatus of claim 13, further comprising a bellows coupled to the lower cover.

16. The apparatus of claim 15, further comprising a screw threaded element coupled to the bellows.

17. The apparatus of claim 16, wherein the cover further comprises a well.

18. A method of making a glass sheet, comprising;
forming a glass melt;
flowing the glass melt through an apparatus according to claim 1;
forming the glass melt into a ribbon; and
separating a sheet from the ribbon.

* * * * *